(12) United States Patent
Matteucci et al.

(10) Patent No.: US 8,343,257 B2
(45) Date of Patent: Jan. 1, 2013

(54) POLYMER PI-BOND-PHILIC FILLER COMPOSITES

(75) Inventors: Scott T. Matteucci, Midland, MI (US);
Shawn D. Feist, Midland, MI (US);
Peter N. Nickias, Midland, MI (US);
Leonardo C. Lopez, Midland, MI (US);
Michael S. Paquette, Midland, MI (US);
Jeffrey C. Munro, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 543 days.

(21) Appl. No.: 12/623,355

(22) Filed: Nov. 20, 2009

(65) Prior Publication Data
US 2010/0126341 A1    May 27, 2010

Related U.S. Application Data

(60) Provisional application No. 61/117,799, filed on Nov. 25, 2008.

(51) Int. Cl.
*B01D 53/22* (2006.01)
*B01D 71/02* (2006.01)
*B01D 71/06* (2006.01)
*C08J 5/22* (2006.01)

(52) U.S. Cl. .......... 95/45; 95/50; 95/52; 96/4; 96/9; 96/11; 96/12; 521/25; 521/27; 252/519.33; 502/439

(58) Field of Classification Search .......... 95/45, 50, 95/52; 96/4, 7, 9, 11, 12; 521/25, 27; 252/519.33; 502/439
See application file for complete search history.

(56) References Cited

U.S. PATENT DOCUMENTS

| 3,758,603 | A | 9/1973 | Steigelmann et al. | |
|---|---|---|---|---|
| 5,015,268 | A * | 5/1991 | Ho | 95/50 |
| 5,670,051 | A | 9/1997 | Pinnau et al. | |
| 6,034,163 | A | 3/2000 | Barbee et al. | |
| 6,172,167 | B1 | 1/2001 | Stapert et al. | |
| 6,316,647 | B1 | 11/2001 | Ohtsu et al. | |
| 6,645,276 | B2 | 11/2003 | Kang et al. | |
| 6,706,771 | B2 | 3/2004 | Kim et al. | |
| 7,250,545 | B2 | 7/2007 | Roman et al. | |
| 7,399,897 | B2 | 7/2008 | Roman et al. | |
| 2007/0256560 | A1* | 11/2007 | Kang et al. | 96/4 |
| 2008/0214743 | A1 | 9/2008 | Broos et al. | |

(Continued)

FOREIGN PATENT DOCUMENTS

EP    1 424 362 A1 * 6/2004
(Continued)

OTHER PUBLICATIONS

Sridhar, S., "Permeation of Carbon Dioxide and Methane Gases through Novel Silver-Incorporated Thin Film Composite Pebax Membranes", 2007, Ind. Eng. Chem. Res., vol. 46, pp. 8144-8151.*

(Continued)

*Primary Examiner* — Jason M Greene (57) ABSTRACT

The instant invention generally provides polymer pi-bond-philic filler composite comprising a molecularly self-assembling material and a pi-bond-philic filler, and a process of making and an article comprising the polymer pi-bond-philic filler composite. The instant invention also generally provides a process of separating a pi-bond-philic gas from a separable gas mixture comprising the pi-bond-philic gas.

18 Claims, 2 Drawing Sheets

U.S. PATENT DOCUMENTS

| | | |
|---|---|---|
| 2010/0041292 A1 | 2/2010 | Kim et al. |
| 2010/0041857 A1 | 2/2010 | Harris et al. |
| 2010/0126342 A1 | 5/2010 | Lopez et al. |
| 2010/0127434 A1 | 5/2010 | Broos et al. |
| 2010/0129591 A1 | 5/2010 | Lopez et al. |
| 2010/0129634 A1 | 5/2010 | Lopez et al. |
| 2010/0129641 A1 | 5/2010 | Lopez et al. |
| 2010/0137478 A1 | 6/2010 | White et al. |

FOREIGN PATENT DOCUMENTS

| | | |
|---|---|---|
| EP | 1468719 | 10/2004 |
| EP | 1552875 | 7/2005 |
| WO | 2007030791 | 3/2007 |
| WO | 2007099397 | 9/2007 |
| WO | 2008101051 | 8/2008 |
| WO | 2008112833 | 9/2008 |
| WO | WO 2008/112833 A1 * | 9/2008 |
| WO | 2008150970 | 12/2008 |
| WO | 2009134824 | 11/2009 |

OTHER PUBLICATIONS

Ciferri, Alberto, "Supramolecular Polymers", Second Edition, 2005, pp. 157-158, CRC Press.

Clementz et al., "Interlamellar Metal Complexes in Layer Silicates III Silver (I)-Arene complexes in smectites", Clays and Clay Minerals, 1972, pp. 181-187.

Corbin et al., "Chapter 6 Hydrogen-Bonded Supramolecular Polymers: Linear and Network Polymers and Self-Assembling Discotic Polymers", Supramolecular Polymers, 2nd edition, CRC Press, 2005, pp. 153-182.

Kim et al., "The structural transitions of $\pi$-complexes of poly(styrene-b-butadiene-b-styrene) block copolymers with silver salts and their relation to facilitated olefin transport", Journal of Membrane Science, 2006, vol. 281, pp. 369-376, Elsevier B.V.

Koevoets et al., "Molecular Recognition in a Thermoplastic Elastomer", Journal of the American Chemical Society, 2005, pp. 2999-3003, vol. 127.

Lips et al., "Incorporation of different crystallizable amide blocks in segmented poly(ester amide)s", Polymer, 2005, pp. 7834-7842, vol. 46, Elsevier Ltd.

Lips et al., "Synthesis and characterization of poly(ester amide)s containing crystallizable amide segments", Polymer, 2005, pp. 7823-7833, vol. 46, Elsevier Ltd.

Michalik et al., "Small Silver Clusters in Smectite Clay Interlayers", Journal of Physical Chemistry, 1996, vol. 100, pp. 4213-4218, American Chemical Society.

Oya et al., "An Antimicrobial and Antifungal Agent Derived from Montmorillonite", Applied Clay Science, 1991, vol. 6, pp. 135-142, Elsevier Science Publishers B.V.

Sridhar et al., "Permeation of Carbon Dioxide and Methane Gases Through Novel Silver-Incorporated Thin Film Composite Pebax Membranes", Ind. Eng. Chem. Res., 2007, vol. 46, pp. 8144-8151, American Chemical Society.

Wiederhorn et al., "Mechanical Properties", Springer-Handbook of Materials Measurement Methods, 2005, pp. 371-397.

* cited by examiner

POLYMER PI-BOND-PHILIC FILLER COMPOSITES

CROSS-REFERENCE TO RELATED APPLICATION(S)

This application claims benefit of priority from U.S. Provisional Patent Application No. 61/117,799, filed Nov. 25, 2008, which application is incorporated by reference herein in its entirety.

The present invention is in the field of polymer pi-bond-philic filler composites, and processes of making, articles comprising, and processes of employing the polymer pi-bond-philic filler composites.

BACKGROUND OF THE INVENTION

There is a need in the polymer art for new polymer pi-bond-philic filler composites, and articles comprising the polymer pi-bond-philic filler composites.

SUMMARY OF THE INVENTION

In a first embodiment, the instant invention is a polymer pi-bond-philic filler composite comprising a molecularly self-assembling (MSA) material and a pi-bond-philic filler dispersed in the MSA material, wherein the pi-bond-philic filler comprises a pi-bond-philic salt or a pi-bond-philic clay, wherein the pi-bond-philic salt (i.e., each molecule thereof) comprises a pi-bond-philic cation and a counter anion and the pi-bond-philic clay comprises a cation exchanging layered material and pi-bond-philic cations, the cation exchanging layered material having a cation exchanging capacity, and the pi-bond-philic filler comprising from 1 weight percent (wt %) to 90 wt % of the polymer pi-bond-philic filler composite based on total weight of the polymer pi-bond-philic filler composite. In some embodiments, the pi-bond-philic filler consists essentially of the pi-bond-philic clay (i.e., lacks the pi-bond-philic salt but may further contain filler that is not pi-bond-philic such as, for example, a starting inorganic clay or starting inorganic salt). More preferably, the pi-bond-philic clay has at least one dimension that is less than 3 micrometers. In other embodiments, the pi-bond-philic filler consists essentially of the pi-bond-philic salt (i.e., lacks the pi-bond-philic clay but may further contain filler that is not pi-bond-philic such as, for example, a starting inorganic clay or starting inorganic salt). In still other embodiments, the pi-bond-philic filler comprises the pi-bond-philic clay and the pi-bond-philic salt.

In a second embodiment, the instant invention is a process for making the polymer pi-bond-philic filler composite of the first embodiment, the process comprising the step of: contacting under mixing conditions a desired amount of the pi-bond-philic filler to either a melt of the MSA material or a solution comprising a solvent and the MSA material to produce the polymer pi-bond-philic filler composite of the first embodiment. Preferably the process employs the melt of the MSA material. In some embodiments, the contacting step comprises exfoliatably contacting under exfoliating conditions.

In a third embodiment, the instant invention is an article comprising the polymer pi-bond-philic filler composite of the first embodiment. Preferably, the article comprises a semipermeable material, more preferably a semipermeable membrane.

In a fourth embodiment, the instant invention is a process for separating a gas from a gas mixture, the process comprising steps of: providing a first gas semipermeable material comprising an effective amount of the polymer pi-bond-philic filler composite of the first embodiment, the first gas semipermeable material having spaced-apart entrance and exit faces; and contacting a separable gas mixture comprising a pi-bond-containing gas and a permeation-resistant gas to the entrance face of the first gas semipermeable material; and removing from the exit face (downstream) of the first gas semipermeable material a first permeant gas comprising a first amount of at least some of the pi-bond-containing gas from the separable gas mixture, the first permeant gas thereby being enriched in the pi-bond-containing gas compared to the separable gas mixture. Preferably, the first gas semipermeable material is a semipermeable membrane.

In a fifth embodiment, the instant invention is a process for making a polymer pi-bond-philic filler composite, the process comprising steps of providing a polymer native inorganic filler composite comprising a molecularly self-assembling (MSA) material and an exchangeable amount of a native inorganic filler dispersed in the MSA material, wherein the native inorganic filler comprises a starting inorganic salt or a starting inorganic clay, wherein the starting inorganic salt (i.e., each molecule thereof) comprises a native inorganic cation and counter anion and the starting inorganic clay comprises a cation exchanging layered material and native inorganic cations, the cation exchanging layered material having a cation exchanging capacity; and contacting a pi-bond-philic cation source material comprising pi-bond-philic cations and counter anions to the polymer native inorganic filler composite, thereby exchanging at least some of the native inorganic cations of the polymer native inorganic filler composite for at least some of the pi-bond-philic cations so as to make the polymer pi-bond-philic filler composite of the first embodiment.

Additional embodiments of the present invention are illustrated in the accompanying drawings and are described in the following detailed description and claims.

DETAILED DESCRIPTION OF THE INVENTION

As used herein, "a," "an," "the," "at least one," and "one or more" are used interchangeably. In any embodiment of the instant invention described herein, the open-ended terms "comprising," "comprises," and the like (which are synonymous with "including," "having," and "characterized by") may be replaced by the respective partially closed phrases "consisting essentially of," consists essentially of," and the like or the respective closed phrases "consisting of," "consists of," and the like. In the present application, when referring to a preceding list of elements (e.g., ingredients), the phrases "mixture thereof," "combination thereof," and the like mean any two or more, including all, of the listed elements.

For purposes of United States patent practice and other patent practices allowing incorporation of subject matter by reference, the entire contents—unless otherwise indicated—of each U.S. patent, U.S. patent application, U.S. patent application publication, PCT international patent application and WO publication equivalent thereof, referenced in the instant Detailed Description of the Invention are hereby incorporated by reference. In an event where there is a conflict between what is written in the present specification and what is written in a patent, patent application, or patent application publication, or a portion thereof that is incorporated by reference, what is written in the present specification controls. The present specification may be subsequently amended to incorporate by reference subject matter from a U.S. patent or U.S. patent application publication, or portion thereof, instead of from a PCT international patent application or WO publication equivalent, or portion thereof, originally referenced herein, provided that no new matter is added and the U.S. patent or U.S. patent application publication claims priority directly from the PCT international patent application.

In the present application, headings (e.g., "Definitions") are used for convenience and are not meant, and should not be used, to limit scope of the present disclosure in any way.

In the present application, any lower limit of a range of numbers, or any preferred lower limit of the range, may be combined with any upper limit of the range, or any preferred upper limit of the range, to define a preferred embodiment of the range. Each range of numbers includes all numbers subsumed within that range (e.g., the range from about 1 to about 5 includes, for example, 1, 1.5, 2, 2.75, 3, 3.80, 4, and 5).

In an event where there is a conflict between a unit value that is recited without parentheses, e.g., 2 inches, and a corresponding unit value that is parenthetically recited, e.g., (5 centimeters), the unit value recited without parentheses controls.

DEFINITIONS

As used herein, the terms "cation exchange capacity" and "cation exchanging capacity" of a cation exchanging layered material are synonymous and represent an amount of a set of exchangeable cations and describes a capability to replace one set of exchangeable cations (typically a capability to replace, if desired, native inorganic ions such as sodium cation ($Na^+$), calcium cation ($Ca^{+2}$) or hydrogen cation ($H^+$)) with another set of cations, preferably pi-bond-philic cations. Pi-bond-philic cations are derived from a pi-bond-philic cation source material, which is described elsewhere herein. The term "exchangeable cations" means monovalent cations, polyvalent cations, or a mixture thereof, each cation having a formal positive charge.

The term "cation exchanging layered material" means a substance derived from a swellable (using the swelling liquid useful in the present invention) inorganic solid (natural or synthetic) comprised of negatively-charged layers (also known as sheets or platelets) comprising counter anions and having a cation exchanging capacity (which is substantially exchangeable in a swollen state). Cations balance (i.e., neutralize) the negative charge of the cation exchanging layered material. The inorganic solid preferably is a swellable, natural or synthetic inorganic clay. The inorganic clay preferably comprises layers of negatively charged material and inorganic cations.

The term "desired amount" means a weight sufficient for producing an intended composite.

The term "dispersed" means distributed substantially evenly throughout a medium (e.g., a polymer).

The term "downstream permeant gas" means a gaseous or vaporous substance comprising a pi-bond-containing gas (i.e., pi-bond-containing gas from the separable gas mixture) that leaves the semipermeable material from its exit face in the process of the fourth embodiment.

The term "effective amount" means a quantity of the polymer pi-bond-philic filler composite of the first embodiment sufficient to separate from greater than 0% to 100%, of the pi-bond-containing gas from the separable gas mixture and into the permeant gas. Preferably, the effective amount is sufficient to ultimately separate at least 10%, more preferably at least 20%, still more preferably at least 30%, and even more preferably at least 60% of the pi-bond-containing gas from the separable gas mixture and into the permeant gas that is ultimately produced by the process of the fourth embodiment (ultimate permeant gas).

The term "exchangeable amount" means weight of a substance, or portion thereof, that is sufficient to be replaced by a desired weight of a pi-bond-philic filler, or pi-bond-philic cation portion thereof.

The term "exfoliatably contacting" and phrase "under exfoliating conditions" are essentially synonymous and mean mixing a pi-bond-philic clay capable of being exfoliated in a medium under conditions facilitating mechanical separation (e.g., via shear) of at least some layers of the pi-bond-philic clay to produce a mixture, suspension, or distribution of an exfoliated pi-bond-philic clay, wherein the is distributed substantially evenly throughout the medium (e.g., a polymer).

The term "exfoliated" means, for present purposes, that the cation exchanging layered material is partially or fully delaminated such that at least 10% of particles thereof have at least one dimension that is less than 100 nm Preferably, the cation exchanging layered material is delaminated into first components, each independently having one, two, three, four, five, six, seven, eight, nine, or ten layers of cation exchanging layered material and, optionally, second components, each independently having more than ten layers of cation exchanging layered material, the volume percent of all of the first components being greater than the volume percent of all of the second components upon examination by transmission electron microscopy of a representative sample of polymer composite. That is, the cation exchanging layered material need not be completely exfoliated into one-layer components, but may exist as a mixture of components having varying numbers of layers as described.

The term "gaseous communication" means a substance in a form of a gas or vapor moving by passive or active means.

The term "pi-bond-philic cation source material" means a substance comprising pi-bond-philic cations and their associated counter anions (e.g., boron tetrafluoride ($BF_4^-$), carbonate ($CO_3^{2-}$), halide (e.g., chloride ($Cl^-$)), hydroxide (e.g., $HO^-$), nitrate ($NO_3^-$), and oxide ($O^{2-}$)).

The phrase "MSA material itself" means the MSA material without (i.e., lacking) pi-bond-philic filler.

The term "native inorganic cation" means a cation of a metal from any one of groups 1, 2, 13, and 14 of the Periodic Table of the Elements. More preferred are lithium cation ($Li^+$), sodium cation ($Na^+$), and potassium cation ($K^+$). Other native inorganic cations include magnesium cation ($Mg^{2+}$), calcium cation ($Ca^{2+}$), and a silicon atom having a formal charge of +4.

The term "native inorganic filler" means a substance comprising at least one native inorganic cation and counter anion, preferably the substance lacks a pi-bond-philic cation.

The term "olefinic hydrocarbon" means any unsaturated hydrocarbon containing at least one carbon-carbon double bond. The unsaturated hydrocarbon consists of from 2 to 20 carbon atoms and either (a) hydrogen atoms or halogen atoms (i.e., one or more halogen atoms wherein each halogen atom independently is fluoro, chloro, bromo, or iodo), or (b) both hydrogen atoms and halogen atoms. Preferably, the unsaturated hydrocarbon consists of from 2 to 20 carbon atoms and hydrogen atoms. The unsaturated hydrocarbon is acyclic or cyclic. The term "acyclic" means straight chain (e.g., 1-butene) or branched chain (e.g., 2-methyl-1-pentene). The term "cyclic" means aromatic (e.g., styrene) or non-aromatic (e.g., cyclohexene). The cyclic unsaturated hydrocarbon consists of hydrogen atoms and from 3 to 20 preferably from 3 to 10, carbon atoms. Preferably, the olefinic hydrocarbon contains only 1 carbon-carbon double bond. In some embodiments, the unsaturated hydrocarbon is unsubstituted. In other embodiments, the unsaturated hydrocarbon is substituted. The term "substituted" means 1 or more substituents, wherein each substituent independently is unsubstituted alkyl of from 1 to 10 carbon atoms, an unsubstituted aryl (e.g., phenyl or naphthyl), or a combination thereof (e.g., an unsubstituted alkyl-aryl and an unsubstituted aryl-alkyl). More preferably, the olefinic hydrocarbon is ethene (also known as ethylene), cyclopropene, cyclobutene, propene, a butene, a pentene, a hexene, a heptene, an octene, a nonene, a decene, or styrene. Still more preferably, the olefinic hydrocarbon is an alpha-olefin or styrene. Even more preferably, the olefinic hydrocarbon is an alpha-olefin.

Unless otherwise noted, the phrase "Periodic Table of the Elements" refers to the periodic table, version dated Jun. 22, 2007, published by the International Union of Pure and Applied Chemistry (IUPAC).

The term "semipermeable material" means a substance comprising the polymer pi-bond-philic filler composite of the first embodiment through which the pi-bond-containing gas passes at a higher permeation rate than a permeation rate of the permeation-resistant gas. A result is that, compared to an original separable gas mixture thereof, a permeant gas that has passed through the polymer pi-bond-philic filler composite has been enriched in (i.e., has a higher percentage of) the pi-bond-containing gas and the remainder of the separable gas mixture that has not passed through the polymer pi-bond-philic filler composite has been enriched in the permeation resistant gas. The semipermeable material may be in any construction such as, for example, a particulate packing material (e.g., for use in a gas filter cartridge) and a membrane, which may be in the form of, for example, a plaque, film, or rolled sheet (e.g., a cylinder), or an asymmetric membrane.

The term "permeation rate" means the rate at which gas moves across a membrane, and is often reported in barrer units. One barrer equals $10^{-10}(cm^3 \text{ gas})*cm/(cm^2*s*cmHg)$, wherein * means multiplication, / means division, ($cm^3$ gas) means moles of the gas in 1 cubic centimeter at standard temperature (25° C.) and pressure (76 cmHg, i.e., 101 kiloPascals); cm means thickness in centimeters of the membrane, $cm^2$ means surface area of the membrane, s means time in seconds, and mmHg and cmHg mean respective testing pressure of the gas in millimeters or centimeters of mercury. Permeability can be measured using, for instance, using a procedure of ASTM D1434. Preferably, permeability of the permeation-resistant gas is measured according to the alkane permeability method described later and permeability of the pi-bond-containing gas is measured according to the olefin permeability method described later.

The term "permeation-resistant gas" means a neutral gaseous or vaporous substance that is inhibited, slowed, or stopped from passing through (e.g., by diffusion or other means) the semipermeable material. Preferably, the permeation-resistant gas is ethylbenzene, air, hydrogen ($H_2$), unsubstituted alkane, or an inert gas such as, for example, helium (He) and argon (Ar). More preferably, the permeation-resistant gas does not contain a pi-bond (e.g., $H_2$, unsubstituted alkane, or an inert gas).

The term "pi-bond-containing gas" means a gaseous or vaporous substance containing at least one pi-bond. Preferred pi-bond containing gas is an olefinic hydrocarbon.

The term "pi-bond-philic cation" means a cation of palladium (Pd) or a metal of any one of Groups 11 and 12 of the Periodic Table of the Elements. The pi-bond-philic cations may be the same or different.

The term "pi-bond-philic clay" means a substance comprising a cation exchanging layered material and pi-bond-philic cations, the cation exchanging layered material having a cation exchanging capacity.

The "polymer pi-bond-philic filler composite" is, in aggregate, neutral. Counter anions for neutralizing cations such as, for example, the pi-bond-philic cations of the polymer pi-bond-philic filler composite, can be contained in any component of, or sourced from any precursor material (e.g., pi-bond-philic filler) to, the polymer pi-bond-philic filler composite, including in or from the MSA material (e.g., in a form of a —COOO$^-$ group).

The term "pi-bond-philic salt" means a substance comprising a pi-bond-philic cation and its associated counter anion (e.g., boron tetrafluoride ($BF_4^-$), carbonate ($CO_3^{2-}$), halide (e.g., chloride ($Cl^-$)), hydroxide (e.g., $HO^-$), nitrate ($NO_3^-$), and oxide ($O^{2-}$)).

The term "removing" (from the exit face of the semipermeable material) means passively (e.g., allowing diffusion) or actively (applying a vacuum source or sweeping with a carrier gas) transporting away.

The term "separable gas mixture" means a composition comprising at least one pi-bond-containing gas and at least one permeation-resistant gas. In some embodiments, the separable gas mixture consists essentially of one or more, preferably one, pi-bond-containing gas and only one permeation-resistant gas or, in other embodiments, pi-bond-containing gas and two or more permeation-resistant gases. Examples of the separable gas mixture are an olefinic hydrocarbon and unsubstituted alkane. Preferably, each gaseous or vaporous substance is characterized as having a normal boiling point at standard pressure (i.e., 101 kiloPascals (kPa)) of about 200° C. or lower, more preferably about 120° C. or lower, still more preferably about 50° C. or lower, and even more preferably about 0° C. or lower.

The term "starting inorganic salt" means a neutral ionic substance comprising native inorganic cation, as described above, and one or more counter anion(s) (e.g., boron tetrafluoride ($BF_4^-$), carbonate ($CO_3^{2-}$), halide (e.g., chloride ($Cl^-$)), hydroxide (e.g., $HO^-$), nitrate ($NO_3^-$), and oxide ($O^{2-}$)).

The term "starting inorganic clay" means a substance comprising a cation exchanging layered material and native inorganic cations, the cation exchanging layered material having a cation exchanging capacity.

The term "$T_g$" means glass transition temperature as determined by differential scanning calorimetry (DSC).

The term "$T_m$" means melting temperature as determined by DSC. If a MSA material has one or more $T_m$, preferably at least one $T_m$ is 25° C. or higher.

For purposes herein, determine $T_g$ and $T_m$ according to the following procedure. Load a sample weighing between 5 milligrams (mg) and 10 mg into an aluminum hermetic DSC pan. Sequentially expose the sample to a first heating scan, holding step, cooling step, and a second heating scan. Particularly, in the first heating scan, heat the sample to 200° C. at a heating rate of 10° C. per minute. Hold the sample at 200° C. for 1 minute, and then cool the sample to −80° C. at a cooling rate of 10° C. per minute. Then in the second heating scan, heat the cooled sample to 200° C. at a heating rate of 10° C. per minute. Determine thermal events such as $T_g$ and $T_m$ from the second heating scan.

The term "unsubstituted alkane" means a straight or branched chain, saturated hydrocarbon consisting of hydrogen atoms and from 1 to 20, preferably from 1 to 10, carbon atoms or a cyclic saturated hydrocarbon consisting of hydrogen atoms and from 3 to 20 preferably from 3 to 10, carbon atoms. Preferably, the unsubstituted alkane is methane, ethane, cyclopropane, cyclobutane, propane, butane, pentane, hexane, heptane, octane, nonane, or decane.

The term "viscosity" means zero shear viscosity unless specified otherwise.

Unless otherwise indicated, each "weight percent" of a component of a multicomponent material is determined by dividing weight of the component by total weight of the multicomponent material, and multiplying the result by 100.

Separable Gas Mixtures

In some embodiments, the separable gas mixture comprises an unsubstituted olefin/unsubstituted alkane mixture. The unsubstituted olefin and unsubstituted alkane contain the same or different number, preferably the same number, of carbon atoms. More preferably, the separable gas mixture comprises ethene/methane, ethene/ethane, propene/propane, 1-butene/butane, 1-octene/octane, or 1-nonene/nonane. In other embodiments, the separable gas mixture comprises one or more olefinic hydrocarbons, one or more alkanes, and one or more inert gases.

In still other embodiments, the separable gas mixture comprises air.

Pi-Bond-Philic Cations

Preferred pi-bond philic cations are copper(I) ($Cu^{+1}$), zinc (II) ($Zn^{+2}$), gold(I) ($Au^{+1}$), cadmium(II) ($Cd^{+2}$), mercury(II) ($Hg^{+2}$), palladium(II) ($Pd^{+2}$), and, more preferably, silver(I) ($Ag^{1}$).

Pi-Bond-Philic Salts

Preferably, the pi-bond-philic salt is obtained from a commercial source (e.g., Aldrich Chemical Company) or prepared from a starting inorganic salt by exchanging inorganic cations thereof (e.g., cations of Groups 1 or 2 of the Periodic Table of the Elements) for pi-bond-philic cations (i.e., replacing at least some of the native inorganic cations with the pi-bond-philic cations) where the starting inorganic salt has not been dispersed in the MSA material. Alternatively, the pi-bond-philic salt is prepared by oxidizing a suitable metal (0).

Pi-Bond-Philic Clays

Preferably, the pi-bond-philic clay is prepared from a starting inorganic clay by exchanging native inorganic cations thereof for pi-bond-philic cations (i.e., replacing at least some of the native inorganic cations with the pi-bond-philic cations) where the starting inorganic clay has not been dispersed in the MSA material. In some embodiments, the cation exchanging capacity of the starting inorganic clay useful for preparing the pi-bond-philic clay is greater than 0 mole percent (mol %) exchanged with the pi-bond-philic cations. In other embodiments, the cation exchanging capacity is 100 mol % or more exchanged with the pi-bond-philic cations. In still other embodiments, the cation exchanging capacity is from greater than 0 mol % to less than 100 mol % exchanged, preferably from 20 mol % to 99 mol % exchanged, with the pi-bond-philic cations. Preferably the cation exchanging capacity is at least 20 mol % exchanged, more preferably at least 50 mol % exchanged, still more preferably at least 75 mol % exchanged, and even more preferably at least 100 mol % exchanged with the pi-bond-philic cations. Where the cation exchange capacity of the starting inorganic clay is less than 100 mol % exchanged with the pi-bond-philic cations, preferably, the remainder of the cation exchanging capacity is unexchanged native inorganic cations.

In other embodiments, the cation exchanging capacity of the starting inorganic clay is more than 100 mol % exchanged with the pi-bond-philic cations. That is, all of the charge-neutralizing native inorganic cations and at least some additional native inorganic cations have been exchanged for pi-bond-philic cations. In such embodiments, the inorganic clay lacks native inorganic cations.

Native inorganic cations of the inorganic clay may be exchanged for pi-bond-philic cations by contacting the starting inorganic clay having native inorganic cations with a solution comprising the pi-bond-philic cations and an ion exchange solvent. A preferred ion exchange solvent is water, methanol, acetone, formic acid, or a mixture thereof. More preferred is water.

The cation exchange capacity of the starting inorganic clay may be measured by several methods, most of which perform an actual exchange reaction and analyze the resulting product for the presence of each of the exchanging ions. Thus, the stoichiometry of exchange preferably is determined on a mole percent (mol %) basis. Preferably, the cation exchange capacities of commercially available starting inorganic clays are provided by commercial suppliers of the starting inorganic clays.

While the particular method used to measure the cation exchange capacity of the starting inorganic clay is not important to the present invention, preferably, the cation exchange capacity of the starting inorganic clay may be measured using the procedure described on page 155 of *Composition and Properties of Oil Well Drilling Fluids*, 4$^{th}$ edition, George R. Gray and H. C. H. Darley, 1980, Gulf Publish Company, Houston, Tex., USA. One method of Gray and Darley involves leaching a first sample of a starting inorganic clay with excess of a suitable salt such as, for example, ammonium acetate to provide a first filtrate and leaching a second sample of the starting inorganic clay with water to provide a second filtrate. Separately analyzing the first and second filtrates for common exchange cations by conventional means provides a milliequivalents (mEQ, defined below) of each species of cation adsorbed on the starting inorganic clay and, thus, total mEQ, i.e., cation exchange capacity (CEC), of all species of cations. The term "milliequivalents" (mEQ) equals millimole equivalents of cation exchange capacity; for example, 125 mEQ means 0.125 moles of cation exchange capacity.

The starting inorganic clay (e.g., a silicate clay or 2:1 silicate clay in its natural state or washed with purified water) preferably has a negative charge on its surface of at least 20 mEQ, more preferably at least 50 mEQ, and preferably 200 mEQ or less, more preferably 150 mEQ or less, still more preferably 125 mEQ or less, per 100 grams (g) of the material.

Preferably, the starting inorganic clay is a natural inorganic clay (consisting essentially of native inorganic cations), more preferably a natural layered silicate (such as a kenyaite), layered 2:1 silicate (such as a natural smectite, hormite, vermiculite, illite, mica, and chlorite), or sepiolite. Examples of preferred starting inorganic clays are layered silicates (such as kenyaite), layered 2:1 silicates (such as natural and synthetic smectites, hormites, vermiculites, illites, micas, and chlorites), attapulgites, and sepiolites. Preferably, the starting inorganic clay is a natural montmorillonite, mica, fluoromica, sepiolite, nontronite, bentonite, kaolinite, beidellite, volkonskoite, hectorite, fluorohectorite, saponite, sauconite, stevensite, halloysite, medmontite, kenyaite, or vermiculite, or a mixture of two or more thereof. More preferably, the starting inorganic clay is a natural mica, fluoromica, montmorillonite, or sepiolite. In some embodiments, the starting inorganic clay is not magadiite or a synthetic hydrous magnesium silicate clay (e.g., LAPONITE®, Rockwood Additives Limited, Cheshire, England). In some embodiments, the starting inorganic clay is a synthetic inorganic clay other than a synthetic hydrous magnesium silicate clay and magadiite. Preferably, the synthetic starting inorganic clay is a synthetic mica (such as, for example, SOMASIF ME-100, Co-Op Chemicals, Japan) or montmorillonite (e.g., CLOISITE™ Na+, Southern Clay Products, Inc., USA).

Molecularly Self-Assembling Material

As used herein a MSA material means an oligomer or polymer that effectively forms larger associated or assembled oligomers and/or polymers through the physical intermolecular associations of chemical functional groups. Without wishing to be bound by theory, it is believed that the intermolecular associations do not increase the molecular weight (Mn-Number Average molecular weight) or chain length of the self-assembling material and covalent bonds between said materials do not form. This combining or assembling occurs spontaneously upon a triggering event such as cooling to form the larger associated or assembled oligomer or polymer structures. Examples of other triggering events are the shear-induced crystallizing of, and contacting a nucleating agent to, a molecularly self-assembling material. Accordingly, in preferred embodiments MSAs exhibit mechanical properties similar to some higher molecular weight synthetic polymers and viscosities like very low molecular weight compounds. MSA organization (self-assembly) is caused by non-covalent bonding interactions, often directional, between molecular functional groups or moieties located on individual molecular (i.e. oligomer or polymer) repeat units (e.g. hydrogen-bonded arrays). Non-covalent bonding interactions include: electrostatic interactions (ion-ion, ion-dipole or dipole-dipole), coordinative metal-ligand bonding, hydrogen bonding, π-π-structure stacking interactions, donor-acceptor, and/or van der Waals forces and can occur intra- and intermolecularly to impart structural order. One preferred mode of self-assembly is hydrogen-bonding and this non-covalent bonding interactions is defined by a mathematical "Association constant", K (assoc) constant describing the relative energetic interaction strength of a chemical complex or group of complexes having multiple hydrogen bonds. Such complexes give rise to the higher-ordered structures in a mass of MSA materials. A description of self assembling multiple H-bonding arrays can be found in "Supramolecular Polymers", Alberto Ciferri Ed., 2nd Edition, pages (pp) 157-158. A "hydrogen bonding array" is a purposely synthesized set (or group) of chemical moieties (e.g. carbonyl, amine, amide, hydroxyl. etc.) covalently bonded on repeating structures or units to prepare a self assembling molecule so that the individual chemical moieties preferably form self assembling donor-acceptor pairs with other donors and acceptors on the same, or different, molecule. A "hydrogen bonded complex" is a chemical complex formed between hydrogen bonding arrays. Hydrogen bonded arrays can have association constants K (assoc) between $10^2$ and $10^9$ $M^{-1}$ (reciprocal molarities), generally greater than $10^3$ $M^{-1}$. In preferred embodiments, the arrays are chemically the same or different and form complexes.

Accordingly, the molecularly self-assembling materials (MSA) include: molecularly self-assembling polyesteramides, copolyesteramide, copolyetheramide, copolyetheresteramide, copolyetherester-urethane, copolyether-urethane, copolyester-urethane, copolyester-urea, copolyetheresterurea and their mixtures. Preferred MSA include copolyesteramide, copolyether-amide, copolyester-urethane, and copolyether-urethanes. The MSA preferably has number average molecular weights, $MW_n$ (interchangeably referred to as $M_n$) (as is preferably determined by NMR spectroscopy) of 2000 grams per mole or more, more preferably at least about 3000 g/mol, and even more preferably at least about 5000 g/mol. The MSA preferably has $MW_n$ 50,000 g/mol or less, more preferably about 20,000 g/mol or less, yet more preferably about 15,000 g/mol or less, and even more preferably about 12,000 g/mol or less. The MSA material preferably comprises molecularly self-assembling repeat units, more preferably comprising (multiple) hydrogen bonding arrays, wherein the arrays have an association constant K (assoc) preferably from $10^2$ to $10^9$ reciprocal molarity ($M^{-1}$) and still more preferably greater than $10^3$ $M^{-1}$; association of multiple-hydrogen-bonding arrays comprising donor-acceptor hydrogen bonding moieties is the preferred mode of self assembly. The multiple H-bonding arrays preferably comprise an average of 2 to 8, more preferably 4-6, and still more preferably at least 4 donor-acceptor hydrogen bonding moieties per molecularly self-assembling unit. Molecularly self-assembling units in preferred MSA materials include bis-amide groups, and bis-urethane group repeat units and their higher oligomers.

Preferred self-assembling units in the MSA material useful in the present invention are bis-amides, bis-urethanes and bis-urea units or their higher oligomers. A more preferred self-assembling unit comprises a poly(ester-amide), poly (ether-amide), poly(ester-urea), poly(ether-urea), poly(esterurethane), or poly(ether-urethane), or a mixture thereof. For convenience and unless stated otherwise, oligomers or polymers comprising the MSA materials may simply be referred to herein as polymers, which includes homopolymers and interpolymers such as co-polymers, terpolymers, etc.

In some embodiments, the MSA materials include "non-aromatic hydrocarbylene groups" and this term means specifically herein hydrocarbylene groups (a divalent radical formed by removing two hydrogen atoms from a hydrocarbon) not having or including any aromatic structures such as aromatic rings (e.g. phenyl) in the backbone of the oligomer or polymer repeating units. In some embodiments, non-aromatic hydrocarbylene groups are optionally substituted with various substituents, or functional groups, including but not limited to: halides, alkoxy groups, hydroxy groups, thiol groups, ester groups, ketone groups, carboxylic acid groups, amines, and amides. A "non-aromatic heterohydrocarbylene" is a hydrocarbylene that includes at least one non-carbon atom (e.g. N, O, S, P or other heteroatom) in the backbone of the polymer or oligomer chain, and that does not have or include aromatic structures (e.g., aromatic rings) in the backbone of the polymer or oligomer chain. In some embodiments, non-aromatic heterohydrocarbylene groups are optionally substituted with various substituents, or functional groups, including but not limited to: halides, alkoxy groups, hydroxy groups, thiol groups, ester groups, ketone groups, carboxylic acid groups, amines, and amides. Heteroalkylene is an alkylene group having at least one non-carbon atom (e.g. N, O, S or other heteroatom) that, in some embodiments, is optionally substituted with various substituents, or functional groups, including but not limited to: halides, alkoxy groups, hydroxy groups, thiol groups, ester groups, ketone groups, carboxylic acid groups, amines, and amides. For the purpose of this disclosure, a "cycloalkyl" group is a saturated carbocyclic radical having three to twelve carbon atoms, preferably three to seven. A "cycloalkylene" group is an unsaturated carbocyclic radical having three to twelve carbon atoms, preferably three to seven. Cycloalkyl and cycloalkylene groups independently are monocyclic or polycyclic fused systems as long as no aromatics are included. Examples of carbocyclic radicals include cyclopropyl, cyclobutyl, cyclopentyl, cyclohexyl and cycloheptyl. In some embodiments, the groups herein are optionally substituted in one or more substitutable positions as would be known in the art. For example in some embodiments, cycloalkyl and cycloalkylene groups are optionally substituted with, among others, halides, alkoxy groups, hydroxy groups, thiol groups, ester groups, ketone groups, carboxylic acid groups, amines, and amides. In some embodiments, cycloalkyl and cycloalkene groups are optionally incorporated into combinations with other groups to form additional substituent groups, for example: "-Alkylene-cycloalkylene-", "-alkylene-cycloalkylene-alkylene-", "-heteroalkylene-cycloalkylene-", and "-heteroalkylene-cycloalkyl-heteroalkylene" which refer to various non-limiting combinations of alkyl, heteroalkyl, and cycloalkyl. These combinations include groups such as oxydialkylenes (e.g., diethylene glycol), groups derived from branched diols such as neopentyl glycol or derived from cyclo-hydrocarbylene diols such as Dow Chemical's UNOXOL® isomer mixture of 1,3- and 1,4-cyclohexanedimethanol, and other non-limiting groups, such -methylcylohexyl-, -methyl-cyclohexyl-methyl-, and the like. "Heterocycloalkyl" is one or more cyclic ring systems having 4 to 12 atoms and, containing carbon atoms and at least one and up to four heteroatoms selected from nitrogen, oxygen, or sulfur. Heterocycloalkyl includes fused ring structures. Preferred heterocyclic groups contain two ring nitrogen atoms, such as piperazinyl. In some embodiments, the heterocycloalkyl groups herein are optionally substituted in one or more substitutable positions. For example in some embodiments, heterocycloalkyl groups are optionally substituted with halides, alkoxy groups, hydroxy groups, thiol groups, ester groups, ketone groups, carboxylic acid groups, amines, and amides.

Examples of MSA materials useful in the present invention are poly(ester-amides), poly(ether-amides), poly(ester-ureas), poly(ether-ureas), poly(ester-urethanes), and poly(ether-urethanes), and mixtures thereof that are described, with preparations thereof, in U.S. Pat. No. 6,172,167; and applicant's co-pending PCT application numbers PCT/US2006/023450, which was renumbered as PCT/US2006/004005 and published under PCT International Patent Application Number (PCT-IPAPN) WO 2007/099397 and U.S. Patent Application Publication Number (USPAPN) 2008-0214743; PCT/US2006/035201, which published under PCT-IPAPN WO 2007/030791; PCT/U.S.08/053,917, which published under PCT-IPAPN WO 2008/101051; PCT/U.S.08/056,754, which published under PCT-IPAPN WO 2008/112833; and PCT/U.S.08/065,242. Preferred said MSA materials are described below.

In a set of preferred embodiments, the molecularly self-assembling material comprises ester repeat units of Formula I:

Formula I and at least one second repeat unit selected from the esteramide units of Formula II and III:

Formula II

Formula III and the ester-urethane units of Formula IV:

Formula IV wherein
R is at each occurrence, independently a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 to about 5000 g/mol. In preferred embodiments, the $C_2$-$C_{20}$ non-aromatic hydrocarbylene at each occurrence is independently specific groups: alkylene-, -cycloalkylene-, -alkylene-cycloalkylene-, -alkylene-cycloalkylene-alkylene- (including dimethylene cyclohexyl groups). Preferably, these aforementioned specific groups are from 2 to 12 carbon atoms, more preferably from 3 to 7 carbon atoms. The $C_2$-$C_{20}$ non-aromatic heterohydrocarbylene groups are at each occurrence, independently specifically groups, non-limiting examples including: -hetereoalkylene-, -heteroalkylene-cycloalkylene-, -cycloalkylene-heteroalkylene-, or -heteroalkylene-cycloalkylene-heteroalkylene-, each aforementioned specific group preferably comprising from 2 to 12 carbon atoms, more preferably from 3 to 7 carbon atoms. Preferred heteroalkylene groups include oxydialkylenes, for example diethylene glycol (—$CH_2CH_2OCH_2CH_2$—O—). When R is a polyalkylene oxide group it preferably is a polytetramethylene ether, polypropylene oxide, polyethylene oxide, or their combinations in random or block configuration wherein the molecular weight (Mn-average molecular weight, or conventional molecular weight) is preferably about 250 g/ml to 5000, g/mol, more preferably more than 280 g/mol, and still more preferably more than 500 g/mol, and is preferably less than 3000 g/mol; in some embodiments, mixed length alkylene oxides are included. Other preferred embodiments include species where R is the same $C_2$-$C_6$ alkylene group at each occurrence, and most preferably it is —$(CH_2)_4$—.
$R^1$ is at each occurrence, independently, a bond, or a $C_1$-$C_{20}$ non-aromatic hydrocarbylene group. In some preferred embodiments, $R^1$ is the same $C_1$-$C_6$ alkylene group at each occurrence, most preferably —$(CH_2)_4$—.
$R^2$ is at each occurrence, independently, a $C_1$-$C_{20}$ non-aromatic hydrocarbylene group. According to another embodiment, $R^2$ is the same at each occurrence, preferably $C_1$-$C_6$ alkylene, and even more preferably $R^2$ is —$(CH_2)_2$—, —$(CH_2)_3$—, —$(CH_2)_4$—, or —$(CH_2)_5$—.
$R^N$ is at each occurrence —$N(R^3)$—Ra—$N(R^3)$—, where $R^3$ is independently H or a $C_1$-$C_6$ alkyl, preferably $C_1$-$C_4$ alkyl, or $R^N$ is a $C_2$-$C_{20}$ heterocycloalkylene group containing the two nitrogen atoms, wherein each nitrogen atom is bonded to a carbonyl group according to Formula II or III above; w represents the ester mol fraction, and x, y and z represent the amide or urethane mole fractions where w+x+y+z=1, 0<w<1, and at least one of x, y and z is greater than zero. Ra is a $C_2$-$C_{20}$ non-aromatic hydrocarbylene group, more preferably a $C_2$-$C_{12}$ alkylene: most preferred Ra groups are ethylene butylene, and hexylene —$(CH_2)_6$—. In some embodiments, $R^N$ is piperazin-1,4-diyl. According to another embodiment, both $R^3$ groups are hydrogen.

n is at least 1 and has a mean value less than 2.

In an alternative embodiment, the MSA is a polymer consisting of repeat units of either Formula II or Formula III, wherein R, $R^1$, $R^2$, $R^N$, and n are as defined above and x and y are mole fractions wherein x+y=1, and $0 \leq x \leq 1$ and $0 \leq y \leq 1$.

In certain embodiments comprising polyesteramides of Formula I and II, or Formula I, II, and III, particularly preferred materials are those wherein R is —$(C_2$-$C_6)$-alkylene, especially —$(CH_2)_4$—. Also preferred are materials wherein $R^1$ at each occurrence is the same and is $C_1$-$C_6$ alkylene, especially —$(CH_2)_4$—. Further preferred are materials wherein $R^2$ at each occurrence is the same and is —$(C_1$-$C_6)$-alkylene, especially —$(CH_2)_5$-alkylene. The polyesteramide according to this embodiment preferably has a number average molecular weight (Mn) of at least about 4000, and no more than about 20,000. More preferably, the molecular weight is no more than about 12,000.

For convenience the chemical repeat units for various embodiments are shown independently. The invention encompasses all possible distributions of the w, x, y, and z units in the copolymers, including randomly distributed w, x, y and z units, alternatingly distributed w, x, y and z units, as well as partially, and block or segmented copolymers, the definition of these kinds of copolymers being used in the conventional manner as known in the art. Additionally, there are no particular limitations in the invention on the fraction of the various units, provided that the copolymer contains at least one w and at least one x, y, or z unit. In some embodiments, the mole fraction of w to (x+y+z) units is between about 0.1:0.9 and about 0.9:0.1. In some preferred embodiments, the copolymer comprises at least 15 mole percent w units, at least 25 mole percent w units, or at least 50 mole percent w units In some embodiments, the number average molecular weight ($M_n$) of the MSA material useful in the present invention is between 1000 g/mol and 30,000 g/mol, inclusive. In some embodiments, $M_n$ of the MSA material is between 2,000 g/mol and 20,000 g/mol, inclusive, preferably 5,000 g/mol to 12,000 g/mol. In more preferred embodiments, $M_n$ of the MSA material is less than 5,000 g/mol. Thus, in some more preferred embodiments, $M_n$ of the MSA material is at least about 1000 g/mol and 4,900 g/mol or less, more preferably 4,500 g/mol or less.

Viscosity of a melt of a preferred MSA material (neat) is characterized as being Newtonian over the frequency range of $10^{-1}$ to $10^2$ radians per second (rad./s.) at a temperature from above a melting temperature $T_m$ up to about 40 degrees Celsius (° C.) above $T_m$, preferably as determined by differential scanning calorimetry (DSC). Depending upon the polymer or oligomer, preferred MSA materials exhibit Newtonian viscosity in the test range frequency at temperatures above 100° C., more preferably above 120° C. and more preferably still at or above 140° C. and preferably less than 300° C., more preferably less than 250° C. and more preferably still less than 200° C. For the purposes of the present disclosure, the term Newtonian has its conventional meaning; that is, approximately a constant viscosity with increasing (or decreasing) shear rate of a (MSA) material at a constant testing temperature. The zero shear viscosity of a preferred MSA material is in the range of from 0.1 Pa·s. to 1000 Pa·s., preferably from 0.1 Pa·s. to 100 Pa·s., more preferably from 0.1 to 30 Pa·s., still more preferred 0.1 Pa·s. to 10 Pa·s., between the temperature range of 180° C. and 220° C., e.g., 180° C. and 190° C.

Preferably, the viscosity of a melt of a MSA material useful in the present invention is less than 100 Pa·s. at from above $T_m$ up to about 40° C. above $T_m$. The viscosity of one of the preferred MSA materials is less than 100 Pa·s. at 190° C., and more preferably in the range of from 1 Pa·s. to 50 Pa·s. at 150° C. to 170° C. Preferably, the glass transition temperature of the MSA material is less than 20° C. Preferably, the melting temperature is higher than 60° C. Preferred MSA materials exhibit multiple glass transition temperatures $T_g$. Preferably, the MSA material has a $T_g$ that is higher than −80° C. Also preferably, the MSA material has a $T_g$ that is higher than −60° C.

Tensile modulus of one preferred group of MSA materials is preferably from 4 megapascals (MPa) to 500 MPa at room temperature, preferably 20° C. Tensile modulus testing is well known in the polymer arts.

Preferably, torsional (dynamic) storage modulus of MSA materials useful in the invention is at least 100 MPa at 20° C. More preferably, the storage modulus is at least 200 MPa, still more preferably at least 300 MPa, and even more preferably greater than 400 MPa, all at 20° C.

Preferably, polydispersities of substantially linear MSA materials useful in the present invention is 4 or less, more preferably 3 or less, still more preferably 2.5 or less, still more preferably 2.2 or less.

In some embodiments, the polymers described herein are modified with, for example and without limitation thereto, other polymers, resins, tackifiers, fillers, oils and additives (e.g. flame retardants, antioxidants, pigments, dyes, and the like).

The Invention Polymer Pi-Bond-Philic Filler Composite

Preferably, the pi-bond-philic fillers comprise a total of at least 1 wt %, more preferably at least 10 wt %, still more preferably at least 20 wt %, and even more preferably at least 30 wt % of the polymer pi-bond-philic filler composite of the first embodiment based on total weight of the polymer pi-bond-philic filler composite. Also preferably, the pi-bond-philic fillers comprise a total of about 80 wt % or less, more preferably about 70 wt % or less, still more preferably about 60 wt % or less, and even more preferably about 50 wt % or less of the polymer pi-bond-philic filler composite of the first embodiment based on total weight of the polymer pi-bond-philic filler composite.

In some embodiments, the pi-bond-philic clay further comprises native inorganic cations. That is, the pi-bond-philic clay comprises the cation exchanging layered material, pi-bond-philic cations, and native inorganic cations, wherein the cation exchanging capacity of the cation exchanging layered material is less than 100% exchanged with the pi-bond-philic cations.

The Process of Making the Invention Polymer Pi-Bond-Philic Filler Composite

In the process of the second embodiment, the MSA material and pi-bond-philic clay are exfoliatably contacted (e.g., compounded or blended under shear) at a temperature of 30° C. or higher and 350° C. or less, provided the temperature is above the MSA material's glass transition temperature ($T_g$) or melt temperature ($T_m$), whichever is higher. In some embodiments, the MSA material and pi-bond-philic filler are compounded at a pressure of 0.1 atmosphere (ATM) to 1000 ATM.

Preferably, temperature of the melt comprising the MSA material during the exfoliatably contacting with (dispersing of) pi-bond-philic filler therein is less than 250° C., more preferably less than 200° C., and still more preferably less than 180° C.

The relatively low temperature of the melt comprising the MSA material and relatively low shear stress during the exfoliatably contacting (e.g., mixing and delaminating) of pi-bond-philic clay thereto as compared to, for example, the temperature of, and shear stress during exfoliatably contacting, a comparator melt comprising a thermoplastic non-MSA polymer to the pi-bond-philic clay, is preferred for MSA materials having the zero shear viscosities described previously (e.g., preferably in the range of from 1 Pa·s. to 50 Pa·s. at 150° C. to 170° C.).

In some embodiments, the melt or solution comprising a MSA material comprises one MSA material. In other embodiments, the melt or solution comprises a mixture of two or more different MSA materials.

The Article Comprising the Polymer Pi-Bond-Philic Filler Composite of the First Embodiment In some embodiments, the article comprises membranes (e.g., pi-bond-containing gas or permeant-resistant gas selective membranes).

In some embodiments, the article comprises the semipermeable membrane. The semipermeable membrane preferably is prepared by cutting a plaque from the semipermeable material or extruding the polymer pi-bond-philic filler composite of the first embodiment (as a mixture comprising the pi-bond-philic filler and a melt of the MSA material) as a film or sheet. The article may also be prepared using a conventional solution casting technique to make a sheet, film, or hollow fiber (i.e., symmetric or asymmetric). In some embodiments, the film, sheet, and hollow fiber is processed into a membrane module such as, for example, a spiral wound module and packed hollow fiber module.

The Process of the Fourth Embodiment

The process of the fourth embodiment comprises a one-pass process or a multiple-pass (i.e., two or more passes) process. For example, in the one-pass process of the fourth embodiment, the first permeant gas is an ultimate permeant gas and is not sent back to the entrance face of the first gas semipermeable material. Instead, the first permeant gas may be provided to, for example, a storage means (e.g., gas cylinder), manufacturing process, or vented. Alternatively, the first permeant gas may be provided to an entrance face of a second gas semipermeable material. In this alternative embodiment, the process further comprising steps of providing one or more second gas semipermeable materials, wherein each second gas semipermeable material independently comprises an effective amount of the polymer pi-bond-philic filler composite of the first embodiment and independently has spaced-apart entrance and exit faces, and the first gas semipermeable material and the one or more second gas semipermeable materials are disposed in a sequential spaced-apart arrangement successively comprising the first gas semipermeable material and from a first one to a last one of the second gas semipermeable materials such that the exit face of the first gas semipermeable material is in sequential gaseous communication with the entrance face of the first one of the second gas semipermeable materials and, ultimately, with the exit face of the last one of the second gas semipermeable materials, wherein the first one and the last one of the second gas semipermeable materials are the same (i.e., when there is one second gas semipermeable material) or different (i.e., wherein there are two or more second gas semipermeable materials); and contacting the first permeant gas to the entrance face of the first one of the second gas semipermeable materials; and ultimately removing from the exit face of the last one of the second gas semipermeable materials a second permeant gas (an ultimate permeant gas) comprising a second amount of at least some of the pi-bond-containing gas from the separable gas mixture, wherein the second amount is greater than the first amount.

In the multiple-pass process aspect of the fourth embodiment, the first permeant gas is contacted to the entrance face of the first gas semipermeable material. Particularly, the multiple-pass process aspect of the fourth embodiment comprises further steps of contacting the first permeant gas to the entrance face of the first gas semipermeable material; and removing from the exit face of the first gas semipermeable material a second permeant gas comprising a second amount of at least some of the pi-bond-containing gas from the separable gas mixture, wherein the second amount is greater than the first amount.

If desired, the further steps of the multiple-pass process may be repeated one or more times (thereby providing a total of three or more passes, respectively) until an ultimate permeant gas contains all of the pi-bond-containing gas from the separable gas mixture or the ultimate permeant gas comprises a desired ultimate amount or higher of the pi-bond-containing gas from the separable gas mixture. For example, if the multiple-pass process is repeated 8 more times, thereby giving a total of 10 passes, then the ultimate permeant gas is a tenth permeant gas and the ultimate amount is a tenth amount. Reaching the desired ultimate amount or higher of the pi-bond-containing gas in the ultimate permeant gas includes reaching a steady-state concentration of the pi-bond-containing gas in the ultimate permeant gas.

A person of ordinary skill in the art may determine a number of second gas semipermeable materials or a number of the passes appropriate for a particular situation without undue experimentation. The determination may depend on factors such as, for example, an initial concentration of the pi-bond-containing gas in the separable gas mixture, separation efficiency of the gas semipermeable material(s), how the ultimate permeant gas will be employed, and whether or not additional pi-bond-containing gas separation means are employed in conjunction with the present invention process. The ordinary skilled person may determine amounts of the pi-bond-containing gas in successive permeant gases without undue experimentation by employing a conventional pi-bond-containing gas sensor suitable for the particular pi-bond-containing gas being measured. Examples of such sensors are an infrared ethylene sensing instrument and other instruments available from, for example, CEA Instruments, Inc., Westwood, N.J., USA.

Alternate Process of Making a Polymer Pi-Bond-Philic Filler Composite

In the process of the fifth embodiment, the process exchanges a sufficient amount of the native inorganic cations of the starting inorganic salt or the starting inorganic clay for at least some of the pi-bond-philic cations of the pi-bond-philic cation source material such that the pi-bond-philic filler of the first embodiment comprises from 1 weight percent (wt %) to 90 wt % of the polymer pi-bond-philic filler composite based on total weight of the polymer pi-bond-philic filler composite.

MATERIALS AND METHODS

Materials

CLOISITE™ Na$^+$ (Southern Clay Products, Inc.) is a natural sodium montmorillonite inorganic clay having CAS No.

1318-93-0. CLOISITE™ Na+ is commercially obtained from Southern Clay Products, Inc., Gonzales, Tex., USA.

Silver tetrafluoroborate (AgBF$_4$) is commercially obtained from Aldrich Chemical Company, Saint Louis, Mo., USA.

Procedure for Determining Number Average Molecular Weight (M$_n$) of a MSA Material by Nuclear Magnetic Resonance Spectroscopy Proton nuclear magnetic resonance spectroscopy (proton NMR or $^1$H-NMR) is used to determine monomer purity, copolymer composition, and copolymer number average molecular weight M$_n$ utilizing the CH$_2$OH end groups. Proton NMR assignments are dependent on the specific structure being analyzed as well as the solvent, concentration, and temperatures utilized for measurement. For ester amide monomers and co-polyesteramides, d4-acetic acid is a convenient solvent and is the solvent used unless otherwise noted. For ester amide monomers of the type called DD that are methyl esters typical peak assignments are about 3.6 to 3.7 ppm for C(=O)—OCH$_3$; about 3.2 to 3.3 ppm for N—CH$_2$—; about 2.2 to 2.4 ppm for C(=O)—CH$_2$—; and about 1.2 to 1.7 ppm for C—CH$_2$—C. For co-polyesteramides that are based on DD with 1,4-butanediol, typical peak assignments are about 4.1 to 4.2 ppm for C(=O)—OCH$_2$—; about 3.2 to 3.4 ppm for N—CH$_2$—; about 2.2 to 2.5 ppm for C(=O)—CH$_2$—; about 1.2 to 1.8 ppm for C—CH$_2$—C, and about 3.6 to 3.75 —CH$_2$OH end groups.

Compounding Procedure for Preparing Polymer Pi-Bond-Philic Filler Composites

Prior to compounding, all MSA materials and pi-bond-philic fillers (i.e., pi-bond-philic salts or pi-bond-philic clays) are pre-weighed and stored separately. A Haake PolyLab Rheocord blender (Haake) is outfitted with a 20 milliliter (mL) bowl. Temperatures of all zones of the Haake mixer are set to 160° C. An air cooling hose is attached to the central one of the zones in order to maintain temperature control. The MSA material is loaded into the 20 mL bowl and allowed to melt. Pi-bond-philic filler is added directly to the MSA material melt. Then, a plunger is lowered into the Haake, and the melt of the MSA material with pi-bond-philic filler (which does not melt) is compounded at a rotor speed of 200 revolutions per minute (rpm), and a residence time of approximately 2.5 minutes. The residence time begins with the lowering of the plunger, and ends with the raising the plunger. Table 1 presents the timing for the compounding.

TABLE 1

Summary of composite compounding procedure

| Time | rpm | Comment |
|---|---|---|
| 0 second | 200 | |
| 10 seconds | 50 | Add MSA material |
| 1 minute 10 seconds | 200 | Allow MSA material to melt |
| 1 minute 30 seconds | 200 | Add pi-bond-philic filler |
| 2 minutes 30 seconds | 200 | Compound to give composite |
| 5 minutes | 0 | Recover composite |

Compression Molding Procedure:

Prior to molding, all samples are allowed to dry overnight (at least 16 hours) at 65° C. in a vacuum of approximately 36 cmHg. Samples of polymer pi-bond-philic filler composites are compression molded into 10 cm×10 cm×0.05 cm and 10 cm×10 cm×0.01 cm plaques using a MPT-14 compression/lamination press (Tetrahedron Associates, Inc., San Diego, Calif., USA). The molding parameters for composites comprising the MSA material of Preparation 1C are listed in Table 2.

TABLE 2

Summary of compression molding parameters for polymer pi-bond-philic filler composites comprising the MSA material of Preparation 1C

| Step | Temperature (° C.) | Temperature ramp rate (° C./minute) | Load, kg (klb) | Load ramp rate, kg/minute (klb/min) | Time (minutes) |
|---|---|---|---|---|---|
| 1 | 140 | 93 | 608 (1.5) | 317 × 10$^3$ (1200) | 5 |
| 2 | 140 | 93 | 4536 (10) | 317 × 10$^3$ (1200) | 4 |
| 3 | 140 | 93 | 18143 (40) | 317 × 10$^3$ (1200) | 3 |
| 4 | 37.8 | 93 | 450 (1) | 317 × 10$^3$ (1200) | 5 |
| 5 | End | | | | |

Pi-Bond-Containing Gas or Alkane Pure Gas Testing Apparatus and Procedure

Figure 2:
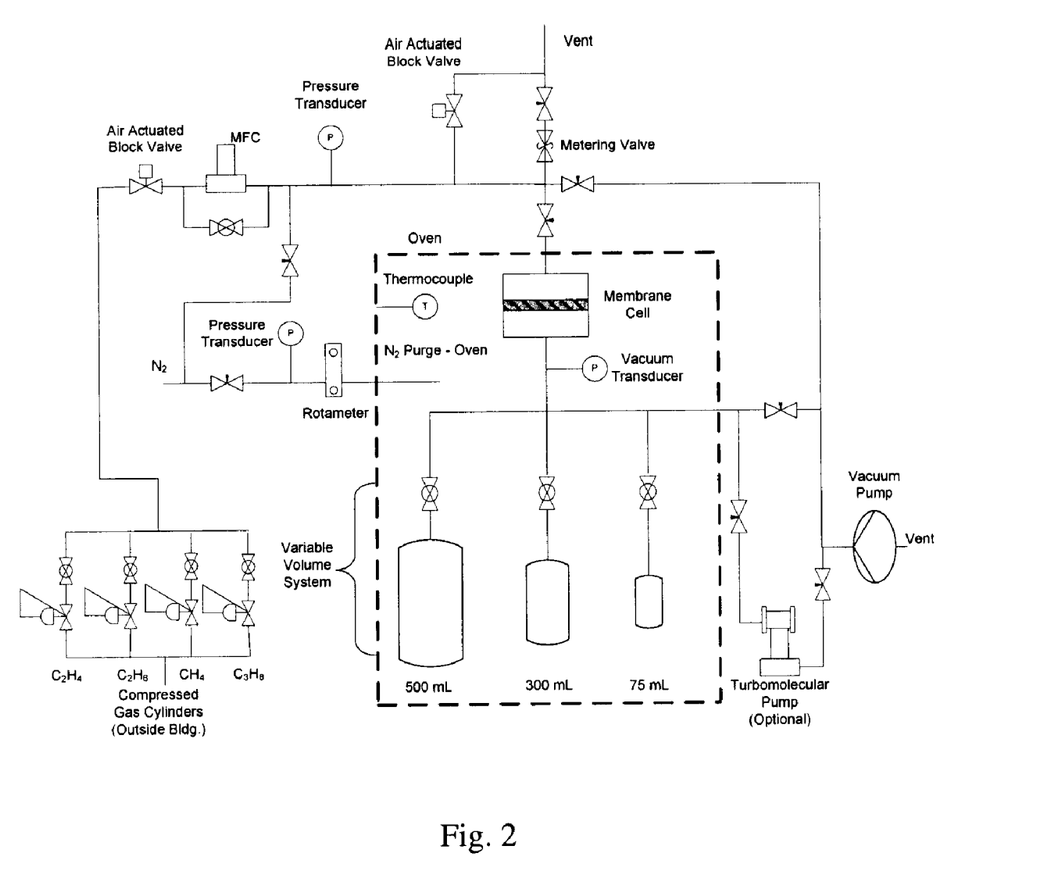
FIG. 2 schematically illustrates a constant-volume variable-pressure pure gas permeation apparatus.

Apparatus: Obtain a gas permeation cell (Stainless Steel In-Line Filter Holder, 47 millimeters (mm), catalog number XX45 047 00 from Millipore Corporation). The gas permeation cell comprises a horizontal metal mesh support and a spaced-apart inlet and outlet respectively above and below the metal mesh support. The gas permeation cell together with a plaque being disposed on the metal mesh support, defines an upstream volume and a downstream volume. The inlet is in sequential fluid communication with the upstream volume, entrance face of the plaque, exit face of the plaque, downstream volume, and outlet. Also obtain a constant-volume variable-pressure pure gas permeation apparatus as schematically illustrated in FIG. 2. The apparatus of FIG. 2 is similar to that described in reference FIG. 7. 109 of Wiederhorn, S., et al., Mechanical Properties in *Springer-Handbook of Materials Measurement Methods*; Czichos, H., Smith, L. E., Saito, T., Eds.; Springer: Berlin, 2005; pages 371-397. In FIG. 2, the apparatus comprises devices such as four compressed gas cylinders (for ethylene ("C$_2$H$_4$"), ethane (C$_2$H$_6$"), methane ("CH$_4$"), and propane ("C$_3$H$_8$")), a first "Air Actuated Block Valve," a mass flow controller ("MFC;" calibrated to ethylene and purposed to regulate upstream gas pressure), a "Pressure Transducer" (see topmost "P") capable of reading pressure from 0 pounds per square inch (psig) to 300 psig (2070 kiloPascals (kPa)), "Metering Valve," vented "Vacuum Pump" (see rightmost "Vent"), an optional "Turbomolecular Pump," and a vented oven (see topmost "Vent" and "Oven"). The oven is indicated by dashed lines ("- - -"). Disposed within the oven are devices comprising three cylinders of different certified volumes ("75 mL," "300 mL," and "500 mL"), a "Vacuum Transducer" (see rightmost "P;" capable of reading pressure in a range of from 0.001 Ton to 1000 Ton (i.e., 0.13 Pascals (Pa) to 130,000 Pa)), a "Pressure Transducer" (see leftmost "P") capable of reading pressure from 0 psig to 200 psig (1400 kPa), a "Thermocouple" (see "T") for monitoring temperature of the oven, and the gas permeation cell ("Membrane Cell"). The Metering Valve is in direct fluid communication via the inlet (not indicated) of the gas permeation cell with the upstream volume (not indicated) of the gas permeation cell. The downstream volume (not indicated) of the gas permeation cell is in direct fluid communication via the outlet (not indicated) of the gas permeation cell with the Vacuum Transducer. The apparatus further comprises gas lines ("—") and adjustable valves (indicated by a horizontal or vertical "⋈" symbol without or with additional symbols (e.g., ⋈)). The gas lines provide fluid communication between the devices, valves, and vents, as schematically illustrated in FIG. 2. Employ a computer operating Camile TG version 5.0 software for data acquisition and pressure and temperature control. For safety reasons, the oven has been fitted with a house nitrogen purge line to purge the oven with nitrogen gas when testing permeation of a flammable pure gas.

Procedure: Prepare a compression molded plaque having spaced-apart entrance and exit faces as described above, and load it into the gas permeation cell. Fix the gas permeation cell inside the oven of the constant-volume variable-pressure pure gas permeation apparatus of FIG. 2. Expose the plaques to vacuum of less than 0.1 Ton (0.01 kiloPascals (kPa)) for at least 16 hours at 20° C. before testing. Then determine a leak rate by closing both upstream and downstream volumes off from being in fluid communication with the vacuum and feed gas, allow the resulting closed off gas permeation cell to sit for 1 hour, and then determining a rate of pressure increase for the closed off gas permeation cell over a period of 5 minutes. Acceptable leak rates are 0.000007 Ton per second (0.0003 Pascals (Pa) per second) or lower. If the leak rate is acceptable, the plaques are exposed to methane at 15 pound-force per square inch gauge (psig) (103 kPa) until the rate of pressure increase reaches a steady state (i.e., less than 0.5% change in pressure increase over a period of at least 10 minutes). Evacuate upstream and downstream volumes using a vacuum pump for at least 16 hours at 20° C., and test methane at additional pressure of 45 psig (310 kPa). Repeat evacuation and test methane at additional pressure of 105 psig (720 kPa). Report permeability values in units of barrer.

PREPARATIONS

Preparations 1A, 1B, and 1C

Preparation of MSA Material that is a Polyesteramide (PEA) Comprising 50 Mole Percent of ethylene-N,N'-dihydroxyhexanamide (C2C) Monomer (the MSA Material is Generally Designated as a PEA-C2C50%)

Step (a) Preparation of the Diamide Diol, ethylene-N,N'-dihydroxyhexanamide (C2C) Monomer The C2C diamide diol monomer is prepared by reacting 1.2 kg ethylene diamine (EDA) with 4.56 kilograms (kg) of ε-caprolactone under a nitrogen blanket in a stainless steel reactor equipped with an agitator and a cooling water jacket. An exothermic condensation reaction between the ε-caprolactone and the EDA occurs which causes the temperature to rise gradually to 80 degrees Celsius (° C.). A white deposit forms and the reactor contents solidify, at which the stirring is stopped. The reactor contents are then cooled to 20° C. and are then allowed to rest for 15 hours. The reactor contents are then heated to 140° C. at which temperature the solidified reactor contents melt. The liquid product is then discharged from the reactor into a collecting tray. A nuclear magnetic resonance study of the resulting product shows that the molar concentration of C2C diamide diol in the product exceeds 80 percent. The melting temperature of the C2C diamide diol monomer product is 140° C.

Step (b): Contacting C2C with Dimethyl Adipate (DMA)

A 100 liter single shaft Kneader-Devolatizer reactor equipped with a distillation column and a vacuum pump system is nitrogen purged, and heated under nitrogen atmosphere to 80° C. (based on thermostat). Dimethyl adipate (DMA; 38.324 kg) and C2C diamide diol monomer (31.724 kg) are fed into the kneader. The slurry is stirred at 50 revolutions per minute (rpm).

Step (c): Contacting C2C/DMA with 1,4-butanediol, Distilling Methanol and Transesterification 1,4-Butanediol (18.436 kg) is added to the slurry of Step (b) at a temperature of about 60° C. The reactor temperature is further increased to 145° C. to obtain a homogeneous solution. Still under nitrogen atmosphere, a solution of titanium(IV)butoxide (153 g) in 1.380 kg 1,4-butanediol is injected at a temperature of 145° C. into the reactor, and methanol evolution starts. The temperature in the reactor is slowly increased to 180° C. over 1.75 hours, and is held for 45 additional minutes to complete distillation of methanol at ambient pressure. 12.664 kilograms of methanol are collected.

Step (d): Distilling 1,4-butanediol and Polycondensation to Give PEA-C2C50%

Reactor dome temperature is increased to 130° C. and the vacuum system activated stepwise to a reactor pressure of 7 mbar (0.7 kiloPascals (kPa)) in 1 hour. Temperature in the kneader/devolatizer reactor is kept at 180° C. Then the vacuum is increased to 0.7 mbar (0.07 kPa) for 7 hours while the temperature is increased to 190° C. The reactor is kept for 3 additional hours at 191° C. and with vacuum ranging from 0.87 to 0.75 mbar. At this point a sample of the reactor contents is taken (Preparation 1A); melt viscosities were 6575 megaPascals (MPa) at 180° C. and 5300 MPa at 190° C. The reaction is continued for another 1.5 hours until the final melt viscosities are recorded as 8400 MPa at 180° C. and 6575 MPa at 190° C. (Preparation 1B). Then the liquid Kneader/Devolatizer reactor contents are discharged at high temperature of about 190° C. into collecting trays, the polymer is cooled to room temperature and grinded. Final product is 57.95 kg (87.8% yield) of melt viscosities 8625 MPa at 180° C. and 6725 MPa at 190° C. (Preparation 1C). Preparations 1A to 1C have the data shown below in Table 3.

TABLE 3

Melt viscosities and molecular weights of samples of MSA Copolyesteramide

| Hours in full vacuum* | Preparation Number | Spindle No. 28** (rpm) | Viscosity at 180° C. (MPa) | Viscosity at 190° C. (MPa) | $M_n$ by 1H-NMR (g/mol) |
|---|---|---|---|---|---|
| 10 | 1A | 20 | 6575 | 5300 | 6450 |
| 11.5 | 1B | 20 | 8400 | 6575 | 6900 |
| 11.5 | 1C | 20 | 8625 | 6725 | 7200 |

*Vacuum < 1.2 mbar
**Viscometer used: Brookfield DV-II+ Viscometer ™

Preparation 2

Preparation of MSA Material that is a Polyesteramide (PEA) Comprising about 18 Mole Percent of ethylene-N,N'-dihydroxyhexanamide (C2C) Monomer (the MSA Material is Generally Designated as a PEA-C2C18%)

The following preparation is designed to give a PEA comprising 18 mol % of the C2C monomer. Into a 1-neck 500 mL round bottom flask is loaded titanium (IV) butoxide (0.31 g, 0.91 mmol), N,N'-1,2-ethanediyl-bis[6-hydroxyhexanamide] (C2C, 30.80 g, 0.1068 mol), dimethyl adipate (103.37 g, 0.5934 mol), and 1,4-butanediol (97.33 g, 1.080 mol). A stir-shaft and blade are inserted into the flask along with a modified Claisen adaptor with Vigreux column and distillation head. Apparatus is completed with stir bearing, stir motor, thermometer, take-off adaptor, receiver, heat-tracing and insulation, vacuum pump, vacuum regulator, nitrogen feed, and temperature controlled bath. Apparatus is degassed and held under positive nitrogen. Flask is immersed into a 160° C. bath with temperature raised to 175° C. for a total of 2 hours. Receiver is changed and vacuum is applied according to the following schedule: 5 minutes, 450 Ton (60 kiloPascals (kPa)); 5 minutes, 100 Ton; 5 minutes, 50 Ton; 5 minutes, 40 Ton; 10 minutes, 30 Ton; 10 minutes, 20 Ton; 1.5 hours, 10 Ton. Apparatus is placed under nitrogen, receiver changed, and placed under vacuum ranging over about 0.36 Ton to 0.46 Ton with the following schedule: 2 hours, 175° C.; 2 hours, to/at 190° C., and 3 hours to/at 210° C. Inherent viscosity=0.32 dL/g (methanol:chloroform (1:1 w/w), 30.0° C., 0.5 g/dL) to give the PEA-C2C18% of Preparation 2. By proton NMR in d4-acetic acid, $M_n$ from end groups of the PEA-C2C18% of Preparation 2 is 11,700 g/mol. The PEA-C2C18% of Preparation 2 contains 17.3 mole % of polymer repeat units contain C2C.

COMPARATIVE EXAMPLE(S)

Comparative Example 1

Unfilled PEA-C2C50% of Preparation 1C

Separate samples of the PEA-C2C50% of Preparation 1C are compression molded as plaques and subjected to pi-bond-containing gas and alkane gas testing with neat ethane or neat ethylene at 105 psig and 20° C. Results are reported later in Table 4.

Comparative Example 2

Preparation of a Plaque of a Composite Comprising the PEA-C2C50% of Preparation 1C and CLOISITE™ Na⁺

A plaque of a composite comprising the PEA-C2C50% of Preparation 1C and CLOISITE™ Na⁺ is prepared according to the above compression molding procedure and subjected to pi-bond-containing gas and alkane gas testing with neat methane, neat ethane or neat ethylene, each at 45 psig and then 105 psig and 20° C. Results are reported later in Table 4. Determine selectivity at 45 psig and 20° C. for ethylene versus methane and ethylene versus ethane. Results are reported later in Table 5.

EXAMPLES OF THE PRESENT INVENTION

Example 1

Preparation of a Plaque Comprising a Polymer Pi-Bond-Philic Clay Composite Comprising PEA-C2C50% and silver(I)-montmorillonite Submerge a predetermined weight of the plaque of Comparative Example 2 in aqueous silver nitrate solution (prepared with silver nitrate obtained from Aldrich Chemical Company), wherein the silver(I) cation is at least 10 times molar excess compared to the sodium cation of the CLOISITE™ Na⁺. After soaking for 1 hour, remove the sample from the solution, rinse it with deionized water, protect it from UV light by placing it in an amber glass container covered by aluminum foil, and allow it to air dry at room temperature (about 20° C.) in a fume hood to give the polymer pi-bond-philic clay composite comprising PEA-C2C50% and silver(I)-montmorillonite.

Example 2

Gas Permeability of the Plaque of Example 1

Subject the plaque of Example 1 to pi-bond-containing gas and alkane gas testing with neat methane, neat ethane or neat ethylene, each at 45 psig and then 105 psig and 20° C. Results are reported in Table 4. Determine permeability selectivity at 45 psig and 20° C. for ethylene versus methane and ethylene versus ethane. Results are reported later in Table 5.

As mentioned before, gas permeability results are reported in Table 4. In Table 4, CE1 and CE2 mean Comparative Example 1 and 2, respectively; Ex. 1 means Example 1; and NT means not tested.

TABLE 4 separate permeability in barrer of neat methane, neat ethane, and neat ethylene at 45 psig and 105 psig pressure and 20° C. for plaques of Comparative Examples 1 and 2 and Example 1

| Plaque | Permeability (barrer) | | | | | |
|---|---|---|---|---|---|---|
| | Methane | | Ethane | | Ethylene | |
| Sample | 45 psig | 105 psig | 45 psig | 105 psig | 45 psig | 105 psig |
| CE1 | NT | NT | NT | 1.93 | NT | 2.05 |
| CE2 | 1.20 | 1.66 | 0.82 | 0.91 | 0.93 | 1.07 |
| Ex. 1 | 0.21 | 0.22 | 0.30 | 0.34 | 0.65 | 0.72 |

Neat gas permeability data in Table 4 show that permeability at 105 psig progressively decreases for ethane and ethylene going from the plaque of Comparative Example 1 (unfilled) to the plaque of Comparative Example 2 (CLOISITE™ Na⁺ filled) to the plaque of Example 1 (Ag⁺-montmorillonite filled). Similarly, the data show that permeability at 45 psig decrease going from the plaque of Comparative Example 2 (CLOISITE™ Na⁺ filled) to the plaque of Example 1 (Ag⁺-montmorillonite filled).

As mentioned before, permeability selectivities are reported in Table 5. In Table 5, CE2 means Comparative Example 2 and Ex. 1 means Example 1.

TABLE 5 separate permeability selectivity ratios at 45 psig and 20° C. for ethylene versus methane and ethylene versus ethane for plaques of Comparative Example 2 and Example 1

| Plaque Sample | Ethylene/methane permeability selectivity ratio | Ethylene/ethane permeability selectivity ratio |
|---|---|---|
| CE2 | 0.8 | 1.1 |
| Ex. 1 | 3.1 | 2.2 |

Permeability selectivity ratio data in Table 5 show that gas permeability of the plaque of Comparative Example 2 (CLOISITE™ Na⁺ filled) is selective for methane over ethylene, whereas gas permeability of the plaque of Example 1 (Ag⁺-montmorillonite filled) is selective for ethylene over methane. These data indicate that a mechanism of gas permeation through the plaque of Example 1 is different than a mechanism of gas permeation throughout the plaque of Comparative Example 2. Also, gas permeability selectivity ratio with the plaque of Comparative Example 2 for ethylene over ethane is 1.1, whereas gas permeability selectivity ratio with the plaque of Example 1 for ethylene over ethane is 2.2.

Example 3

Preparation of a Polymer Pi-Bond-Philic Salt Composite Comprising PEA-C2C50% and 10 wt % Silver Tetrafluoroborate Dry a sample of the PEA-C2C50% of Preparation 1C in a vacuum oven at 85° C. for more than 4 hours. Mix a predetermined amount of the resulting dried sample with solvent mixture chloroform/methanol (50:50 volume/volume percent (v/v)) to give an amber-colored, clear solution having a concentration of 20 grams of the PEA-C2C50% per 100 milliliters (mL) of the solvent mixture. Add a predetermined amount of $AgBF_4$ to the solution, wherein the predetermined amount of $AgBF_4$ is sufficient to ultimately give the polymer pi-bond-philic salt composite having 10 wt % $AgBF_4$ assuming complete mass recovery. Pour solution into a poly(tetrafluoroethylene) (PTFE) dish, cover, and place under a gentle flow of nitrogen gas to allow solvent to slowly evaporate over about 6 days to give a mass of the polymer pi-bond-philic salt composite comprising PEA-C2C50% and $AgBF_4$. Cut mass into plaques and place in vacuum oven at 85° C. for 4 days. Store resulting dried plaques in amber vials in dry box to minimize exposure to ultraviolet (UV) light and moisture.

Example 4

Figure 1:
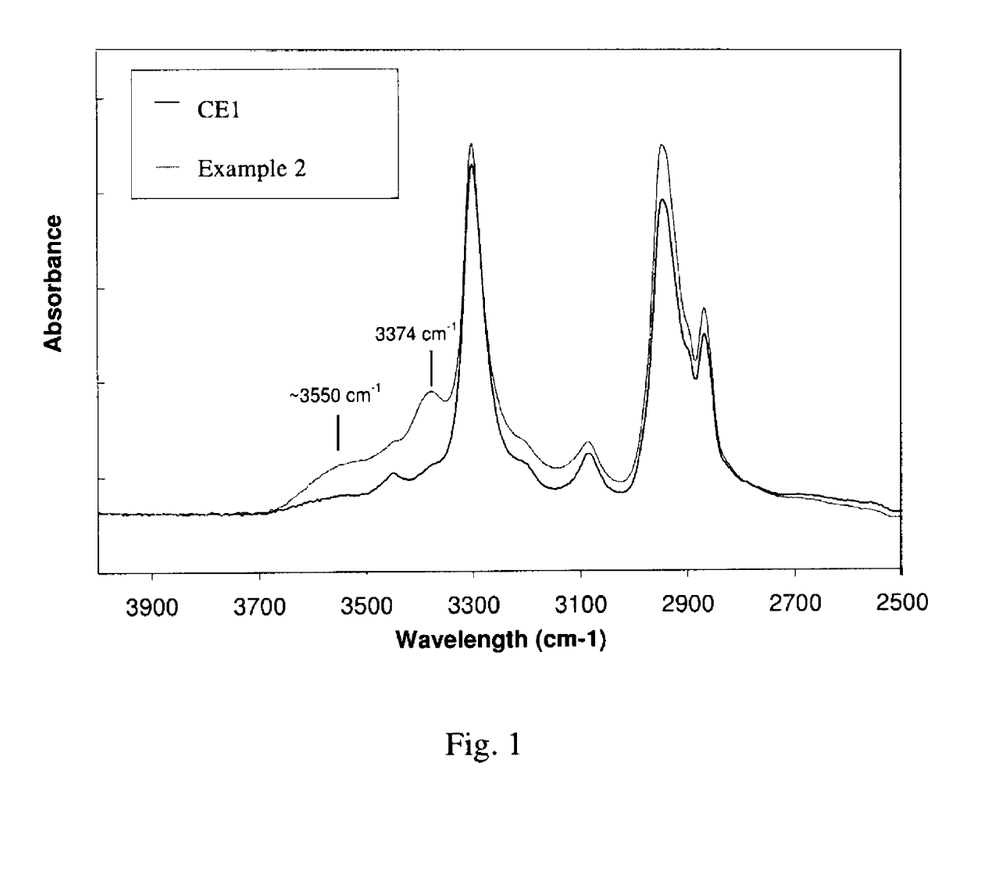
FIG. 1 graphically depicts a Fourier Transform-Infrared (FT-IR) spectrograph of the MSA material of Comparative Example 1 (CE1) and the polymer pi-bond-philic salt composite of Example 4 (Example 4).

Preparation of a Polymer Pi-Bond-Philic Salt Composite Comprising PEA-C2C50% and 5 wt % Silver Tetrafluoroborate The procedure of Example 3 is repeated except the predetermined amount of $AgBF_4$ is sufficient to ultimately give the polymer pi-bond-philic salt composite having 5 wt % $AgBF_4$ assuming complete mass recovery. A solution-cast film comprising the polymer pi-bond-philic salt composite comprising PEA-C2C50% and 5 wt % silver tetrafluoroborate is mounted on a diamond ATR crystal, and subjected to FT-IR spectroscopy with the Nexus 670 FT-IR Spectrophotometer. FT-IR results are also graphically depicted in FIG. 1 as a plot of Absorbance versus Wavelength in $cm^{-1}$. In FIG. 1, a peak at 3374 $cm^{-1}$ is attributed to a bonding interaction between the PEA-C2C50% and the $AgBF_4$.

Example 5

Gas Permeability of the Plaque of Example 3

Subject a plaque of Example 3 to pi-bond-containing gas and alkane gas testing with neat methane, neat ethane or neat ethylene, each at 15 psig and then 45 psig and 20° C. Results are reported in Table 6. Determine permeability selectivity at 15 psig and 20° C. for ethylene versus methane and ethylene versus ethane. Results are reported later in Table 7.

As mentioned before, gas permeability results are reported in Table 6. In Table 6, CE1 means Comparative Example 1, respectively; and Ex. 3 means Example 3.

TABLE 6 separate permeability in barrer of neat methane, neat ethane, and neat ethylene at 15 psig and 45 psig pressure and 20° C. for plaques of Comparative Example 1 and Example 3

| Plaque | Permeability (barrer) | | | | | |
|---|---|---|---|---|---|---|
| | Methane | | Ethane | | Ethylene | |
| Sample | 15 psig | 45 psig | 15 psig | 45 psig | 15 psig | 45 psig |
| CE1 | 0.35 | 0.39 | 0.46 | 0.5 | 0.96 | 1.02 |
| Ex. 3 | 0.21 | 0.19 | 0.14 | 0.24 | 0.66 | 0.78 |

Neat gas permeability data in Table 6 show that permeability at 15 psig or 45 psig progressively decreases for methane, ethane and ethylene going from the plaque of Comparative Example 1 (unfilled) to the plaque of Example 3 ($AgBF_4$ filled).

As mentioned before, permeability selectivities are reported in Table 7. In Table 7, CE1 means Comparative Example 1 and Ex. 3 means Example 3.

TABLE 7 separate permeability selectivity ratios at 15 psig and 20° C. for ethylene versus methane and ethylene versus ethane for plaques of Comparative Example 1 and Example 3

| Plaque Sample | Ethylene/methane permeability selectivity ratio | Ethylene/ethane permeability selectivity ratio |
|---|---|---|
| CE1 | 2.7 | 2.1 |
| Ex. 3 | 3.2 | 4.7 |

Permeability selectivity ratio data in Table 7 show that gas permeability of the plaques of Comparative Example 1 (unfilled) and Example 3 ($AgBF_4$ filled) are each selective for ethylene over methane and ethylene over ethane. As shown in Table 7, the plaque of Example 3 is about 19% (1.2 times) more selective for ethylene over methane and about 120% (2.2 times) more selective for ethylene over ethane than is the plaque of Comparative Example 1.

Example 6

Preparation of a Plaque Comprising a Polymer Pi-Bond-Philic Clay Composite Comprising PEA-C2C18% and silver(I)-montmorillonite Submerge a predetermined weight of CLOISITE™ Na⁺ in aqueous silver nitrate solution (prepared with silver nitrate obtained from Aldrich Chemical Company), wherein the silver(I) cation is at least 10 times molar excess compared to the sodium cation of the CLOISITE™ Na⁺. After soaking for 22 hours, remove the sample from the solution, rinse it with deionized water, and protect it from UV light by placing it in an amber glass container covered by aluminum foil. Redisperse the sample in deionized water, drip the sample into a stirred bath of liquid nitrogen at a rate of 2 mL/minute, and freeze dry the sample to make silver(I)-montmorillonite. Compound a predetermined amount of the silver(I)-montmorillonite with the PEA-C2C18% of Preparation 2 according to the compounding procedure described previously to give the polymer pi-bond-philic clay composite comprising PEA-C2C18% and 5 wt % silver(I)-montmorillonite. Compression mold samples of the polymer pi-bond-philic clay composite in form of plaques using the compression molding procedure described previously.

Subject a plaque of Example 6 to pi-bond-containing gas and alkane gas testing with neat methane, neat ethane or neat ethylene, each at 15 psig and then 45 psig and 20° C. Results are reported in Table 8. Determine permeability selectivity at 45 psig and 20° C. for ethylene versus methane and ethylene versus ethane. Results are reported later in Table 9.

TABLE 8 separate permeability in barrer of neat methane, neat ethane, and neat ethylene at 15 psig and 45 psig pressure and 20° C. for plaques of Example 6 (Ex. 6)

| Plaque | Permeability (barrer) | | | | | |
|---|---|---|---|---|---|---|
| | Methane | | Ethane | | Ethylene | |
| Sample | 15 psig | 45 psig | 15 psig | 45 psig | 15 psig | 45 psig |
| Ex. 6 | 1.21 | 1.36 | 2.21 | 2.57 | 7.89 | 9.09 |

TABLE 9 separate permeability selectivity ratios at 45 psig and 20° C. for ethylene versus methane and ethylene versus ethane for plaques of Example 6 (Ex. 6)

| Plaque Sample | Ethylene/methane permeability selectivity ratio | Ethylene/ethane permeability selectivity ratio |
|---|---|---|
| Ex. 6 | 6.7 | 3.5 |

The above Examples show that the polymer pi-bond-philic filler composites of the first embodiment are effective for separating a pi-bond-containing gas from a separable gas mixture comprising the pi-bond-containing gas and a permeation-resistant gas.

While the invention has been described above according to its preferred embodiments of the present invention and examples of steps and elements thereof, it may be modified within the spirit and scope of this disclosure. This application is therefore intended to cover any variations, uses, or adaptations of the instant invention using the general principles disclosed herein. Further, this application is intended to cover such departures from the present disclosure as come within the known or customary practice in the art to which this invention pertains and which fall within the limits of the following claims.

What is claimed is:

1. A polymer pi-bond-philic filler composite comprising a molecularly self-assembling (MSA) material and a pi-bond-philic filler dispersed in the MSA material, wherein the molecularly self-assembling material comprises repeat units of formula I:

Formula I and at least one second repeat unit selected from the ester-amide units of Formula II:

Formula II and the ester-urethane units of Formula IV:

Formula IV or combinations thereof wherein:

R is at each occurrence, independently a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 grams per mole to about 5000 grams per mole; $R^1$ at each occurrence independently is a bond or a $C_1$-$C_{20}$ non-aromatic hydrocarbylene group; $R^2$ at each occurrence independently is a $C_1$-$C_{20}$ non-aromatic hydrocarbylene group; $R^N$ is —N($R^3$)—Ra—N($R^3$)—, where $R^3$ at each occurrence independently is H or a $C_1$-$C_6$ alkylene and Ra is a $C_2$-$C_{20}$ non-aromatic hydrocarbylene group, or $R^N$ is a $C_2$-$C_{20}$ heterocycloalkyl group containing the two nitrogen atoms; n is at least 1 and has a mean value less than 2; and w represents the ester mol fraction of Formula I, and z represent the amide or urethane mole fractions of Formulas II and IV, respectively, where w+x+z=1, and $0 \leq w \leq 1$, and at least one of x and z is greater than zero but less than 1, wherein the pi-bond-philic filler comprises a pi-bond-philic salt or a pi-bond-philic clay, wherein the pi-bond-philic salt comprises a pi-bond-philic cation and counter anion and the pi-bond-philic clay comprises a cation exchanging layered material and pi-bond-philic cations, the cation exchanging layered material having a cation exchanging capacity, and the pi-bond-philic filler comprising from 1 weight percent (wt %) to 90 wt % of the polymer pi-bond-philic filler composite based on total weight of the polymer pi-bond-philic filler composite.

2. The polymer pi-bond-philic filler composite as in claim 1, wherein the pi-bond-philic filler comprises the pi-bond-philic clay.

3. The polymer pi-bond-philic filler composite as in claim 1, wherein the pi-bond-philic filler comprises the pi-bond-philic salt.

4. The polymer pi-bond-philic filler composite as in claim 1, wherein each pi-bond-philic cation independently is copper(I) ($Cu^{+1}$), zinc(II) ($Zn^{+2}$), gold(I) ($Au^{+1}$), cadmium(II) ($Cd^{+2}$), mercury(II) ($Hg^{+2}$), palladium(II) ($Pd^{+2}$), or silver(I) ($Ag^{+1}$).

5. The polymer pi-bond-philic filler composite as in claim 4, wherein each pi-bond-philic cation is silver(I) ($Ag^{+1}$).

6. The polymer pi-bond-philic filler composite as in claim 1, wherein the molecularly self-assembling material is a polyester-amide, polyether-amide, polyester-urethane, polyether-urethane, polyether-urea, polyester-urea, or a mixture thereof.

7. The polymer pi-bond-philic filler composite as in claim 1, wherein the MSA material comprises self-assembling units comprising multiple hydrogen bonding arrays.

8. The polymer pi-bond-philic filler composite as in claim 1, wherein the number average molecular weight (Mn) of the molecularly self-assembling material is between about 1000 grams per mole and about 50,000 grams per mole.

9. The polymer pi-bond-philic filler composite as in claim 1, wherein the MSA material itself is characterized by a melt viscosity of less than 100 pascal-seconds (Pa·sec.) at from above melting temperature ($T_m$) up to about 40 degrees Celsius (° C.) above $T_m$.

10. The polymer pi-bond-philic filler composite as in claim 1, wherein the MSA material itself is characterized by a melting temperature ($T_m$) greater than 60° C. or a glass transition temperature ($T_g$) greater than −80° C.

11. A process for making a polymer pi-bond-philic filler composite, the process comprising a step of: contacting under mixing conditions a desired amount of the pi-bond-philic filler to either a melt of the MSA material or a solution comprising a solvent and the MSA material to produce the polymer pi-bond-philic filler composite of claim 1.

12. A process for making a polymer pi-bond-philic filler composite, the process comprising steps of providing a polymer native inorganic filler composite comprising a molecularly self-assembling (MSA) material and an exchangeable amount of a native inorganic filler dispersed in the MSA material, wherein the native inorganic filler comprises a starting inorganic salt or a starting inorganic clay, wherein the starting inorganic salt comprises a native inorganic cation and counter anion and the starting inorganic clay comprises a cation exchanging layered material and native inorganic cations, the cation exchanging layered material having a cation exchanging capacity; and contacting an inorganic cation source material comprising pi-bond-philic cations and counter anions to the polymer native inorganic filler composite, thereby exchanging at least some of the native inorganic cations of the polymer native inorganic filler composite for at least some of the pi-bond-philic cations so as to make the polymer pi-bond-philic filler composite of claim 1.

13. An article comprising the polymer pi-bond-philic filler composite as in claim 1.

14. The article as in claim 13, the article comprising packaging, a blow molded article, barrier material, or a membrane.

15. The article as in claim 14, the article comprises a gas permeable material.

16. A process for separating a gas from a gas mixture, the process comprising the steps of: providing a first gas permeable material comprising an effective amount of the polymer pi-bond-philic filler composite as in claim 1, the first gas permeable material having spaced-apart entrance and exit faces; and contacting a separable gas mixture comprising a pi-bond-containing gas and a permeation-resistant gas to the entrance face of the first gas permeable material; and removing from the exit face of the first gas permeable material a first permeant gas comprising a first amount of at least some of the pi-bond-containing gas from the separable gas mixture.

17. The process as in claim 16, wherein the process further comprises steps of contacting the first permeant gas to the entrance face of the first gas permeable material; and removing from the exit face of the first gas permeable material a second permeant gas comprising a second amount of at least some of the pi-bond-containing gas from the separable gas mixture, wherein the second amount is greater than the first amount.

18. A process for separating a gas from a gas mixture, the process comprising the steps of: providing a first gas permeable material comprising an effective amount of a polymer pi-bond-philic filler composite, the first gas permeable material having spaced-apart entrance and exit faces; and contacting a separable gas mixture comprising a pi-bond-containing gas and a permeation-resistant gas to the entrance face of the first gas permeable material; and removing from the exit face of the first gas permeable material a first permeant gas comprising a first amount of at least some of the pi-bond-containing gas from the separable gas mixture, the process further comprising steps of providing one or more second gas permeable materials, wherein each first and second gas permeable material independently comprises an effective amount of the polymer pi-bond-philic filler composite as in claim 1 and each second gas permeable material independently has spaced-apart entrance and exit faces, and the first gas permeable material and the second gas permeable materials are disposed in a sequential spaced-apart arrangement successively comprising the first gas permeable material and from a first one to a last one of the second gas permeable materials such that the exit face of the first gas permeable material is in sequential gaseous communication with the entrance face of the first one of the second gas permeable materials and, ultimately, with the exit face of the last one of the second gas permeable materials, wherein the first one and the last one of the second gas permeable materials are the same or different; and contacting the first permeant gas to the entrance face of the first one of the second gas permeable materials; and ultimately removing from the exit face of the last one of the second gas permeable materials a second permeant gas comprising a second amount of at least some of the pi-bond-containing gas from the separable gas mixture, wherein the second amount is greater than the first amount.

* * * * *